(12) United States Patent
Pedigo et al.

(10) Patent No.: US 10,137,648 B2
(45) Date of Patent: Nov. 27, 2018

(54) MATERIAL PLACEMENT SYSTEM

(71) Applicant: The Boeing Company, Chicago, IL (US)

(72) Inventors: Samuel Francis Pedigo, Lake Forest Park, WA (US); Perry Thomas Horst, Tacoma, WA (US); Brice Aaron Johnson, Federal Way, WA (US)

(73) Assignee: The Boeing Company, Chicago, IL (US)

(*) Notice: Subject to any disclaimer, the term of this patent is extended or adjusted under 35 U.S.C. 154(b) by 113 days.

(21) Appl. No.: 15/096,254

(22) Filed: Apr. 11, 2016

(65) Prior Publication Data

US 2016/0221276 A1   Aug. 4, 2016

Related U.S. Application Data

(62) Division of application No. 13/247,706, filed on Sep. 28, 2011, now Pat. No. 9,308,692.

(51) Int. Cl.
*B29C 70/38*   (2006.01)
*B29C 70/16*   (2006.01)
(Continued)

(52) U.S. Cl.
CPC ............ *B29C 70/384* (2013.01); *B29C 70/16* (2013.01); *B29C 70/38* (2013.01); *B29C 70/382* (2013.01);
(Continued)

(58) Field of Classification Search
CPC ..... B29C 70/38; B29C 70/384; B29C 70/388; B29C 70/16; B29C 70/382; Y10T 83/664;
(Continued)

(56) References Cited

U.S. PATENT DOCUMENTS 4,382,836 A    5/1983  Frank
4,560,433 A *  12/1985 Frank .................... B29C 70/388
                                               156/459

(Continued)

FOREIGN PATENT DOCUMENTS

EP    2574448 A1   4/2013
FR    2865156      7/2005
(Continued)

OTHER PUBLICATIONS

EP search report dated Dec. 21, 2012 regarding application 12186077.9, reference NAM/P123980EP00, applicant The Boeing Company, 5 pages.

(Continued)

*Primary Examiner* — Vishal I Patel
(74) *Attorney, Agent, or Firm* — Yee & Associates, P.C.

(57) ABSTRACT

A method for placing material for a composite part. A roller may be positioned relative to a material delivery structure in which the roller is associated with an end of the material delivery structure. A material delivery structure may be moved relative to a mold. A plurality of lengths of material may be moved towards a roller associated with an end of the material delivery structure. The plurality of lengths of material may be placed on the mold with the roller.

19 Claims, 17 Drawing Sheets

(51) Int. Cl.
    *B29K 105/08*     (2006.01)
    *B29L 31/30*      (2006.01)
(52) U.S. Cl.
    CPC .... *B29C 70/388* (2013.01); *B29K 2105/0872* (2013.01); *B29L 2031/3076* (2013.01); *Y10T 83/04* (2015.04); *Y10T 83/664* (2015.04)
(58) Field of Classification Search
    CPC ............ Y10T 83/04; B29K 2105/0872; B29L 2031/3076
    See application file for complete search history.

(56) References Cited

U.S. PATENT DOCUMENTS

| | | | |
|---|---|---|---|
| 5,045,147 | A | 9/1991 | Benson et al. |
| 5,700,347 | A | 12/1997 | McCowin |
| 5,979,531 | A | 11/1999 | Barr et al. |
| 7,591,294 | B2 | 9/2009 | Wampler et al. |
| 8,052,819 | B2 | 11/2011 | Munaux et al. |
| 9,308,692 | B2 | 4/2016 | Pedigo et al. |
| 2005/0061422 | A1 | 3/2005 | Martin |
| 2007/0029038 | A1* | 2/2007 | Brown .................. B29C 70/38 156/297 |
| 2007/0044919 | A1 | 3/2007 | Hoffman |
| 2009/0140451 | A1 | 6/2009 | Wampler et al. |
| 2010/0252183 | A1 | 10/2010 | Munaux et al. |
| 2012/0222810 | A1* | 9/2012 | Vaniglia ................ B29C 70/384 156/306.3 |

FOREIGN PATENT DOCUMENTS

| | | |
|---|---|---|
| FR | 2982783 A | 5/2013 |
| JP | H022763832 A | 11/1990 |
| JP | 2007503329 A | 2/2007 |
| JP | 2011508708 A | 3/2011 |

OTHER PUBLICATIONS

Japanese Office Action, dated Jul. 12, 2016, regarding Application No. 2012214048, 7 pages.
Second Chinese Office Action, dated Aug. 4, 2016, regarding Application No. 201210371244.1, 17 pages.
Canadian Examination Search Report, dated May 2, 2018, regarding Application No. 2790303, 4 pages.
European Examination Report, dated Dec. 5, 2017, regarding Application No. 12186077.9, 4 pages.

* cited by examiner

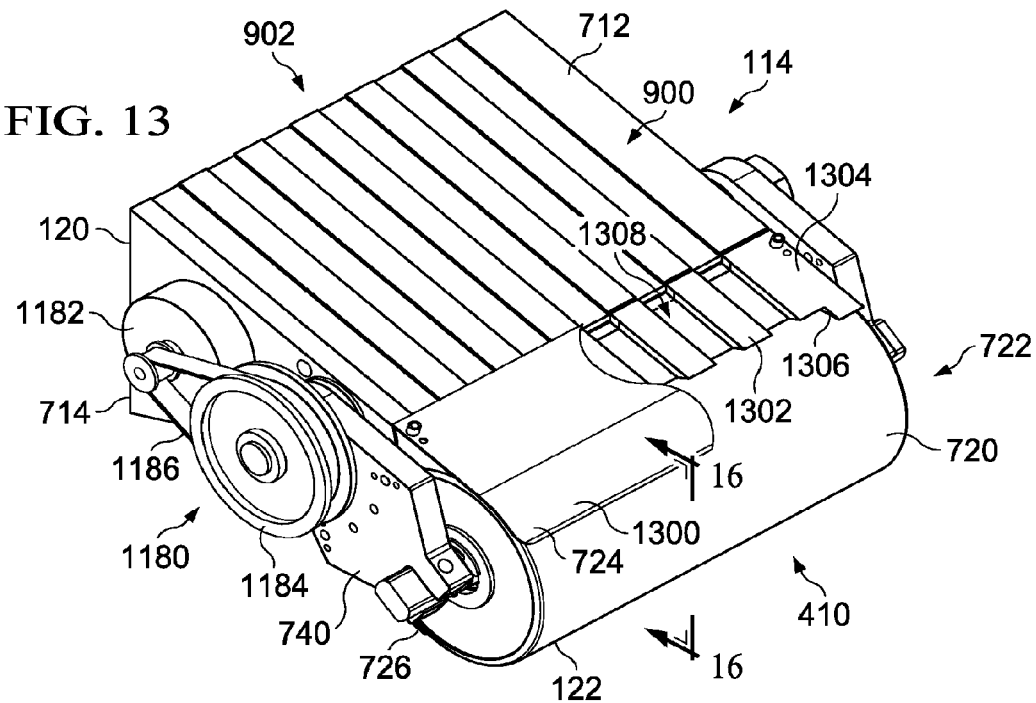
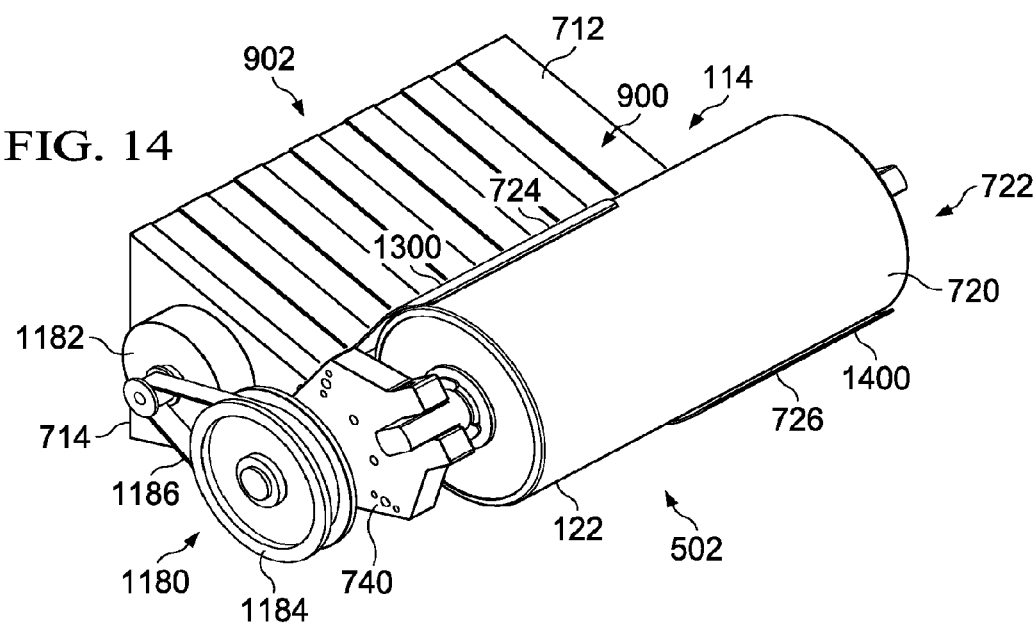

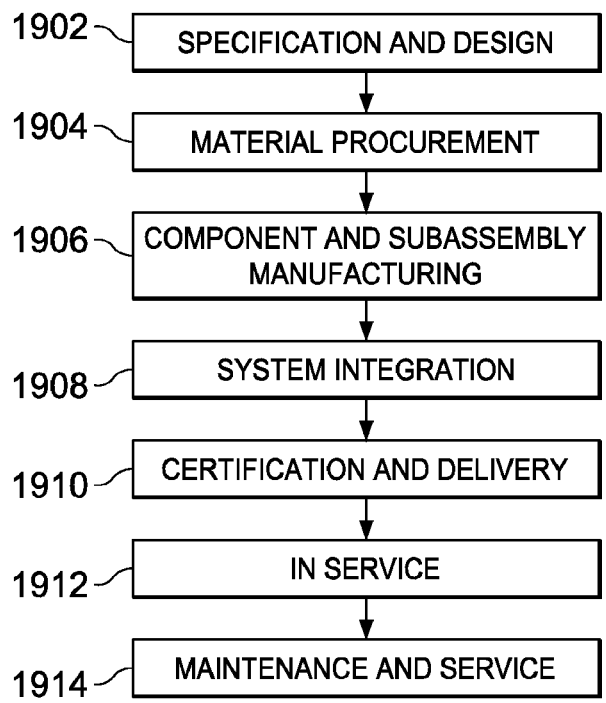
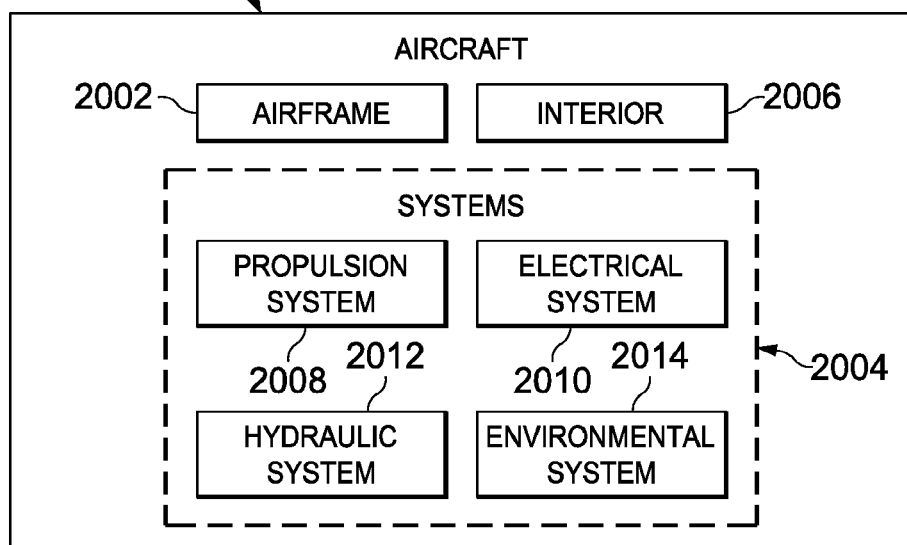

MATERIAL PLACEMENT SYSTEM

This application is a divisional of U.S. patent application Ser. No. 13/247,706, filed Sep. 28, 2011 which issued as U.S. Pat. No. 9,308,692 on Apr. 12, 2016.

BACKGROUND INFORMATION

1. Field

The present disclosure relates generally to aircraft and, in particular, to composite parts for aircraft. Still more particularly, the present disclosure relates to methods for placing material onto a mold for an aircraft part.

2. Background

In forming a composite part, layers of fiber materials may be laid down on a mold. These materials may be, for example, without limitation, resin impregnated fibers. These fiber materials may take different forms. For example, fiber materials may take the form of a tow. A tow may be a bundle of individual fibers.

Placing fiber materials onto a mold may be time consuming and tedious for a human operator. Currently, different machines may be used to place fiber materials onto molds.

For example, a machine may have an end effector that may start moving in a direction from a starting location and dispense fiber material onto a surface of the mold. In some cases, a fiber placement head may travel from a starting location to an end location laying down fiber material onto the surface of the mold. When the end location is reached, the fiber material may be cut. The fiber placement head may rotate about 180 degrees and move to an offset position. The fiber placement head may then move in an opposite direction to lay down the fiber material on the mold. This rotation of the head also may take more time than desired in laying down fiber material. Further, this type of rotation also may increase the wear and tear on the fiber placement head.

Therefore, it would be advantageous to have a method and apparatus that takes into account at least some of the issues discussed above as well as possibly other issues.

SUMMARY

In one advantageous embodiment, a method for placing material for a composite part may be provided. A roller may be positioned relative to a material delivery structure in which the roller is associated with an end of the material delivery structure. A material delivery structure may be moved relative to a mold. A plurality of lengths of material may be moved towards a roller associated with an end of the material delivery structure. The plurality of lengths of material may be placed on the mold with the roller.

In another advantageous embodiment, a method for placing material for a composite part by moving a material delivery structure relative to a mold may be provided. A plurality of lengths of material may be moved towards a roller associated with an end of the material delivery structure. The roller may be configured to move between a first position and a second position relative to the material delivery structure. A material movement system may move a first number of lengths of material in the plurality of lengths of material towards the roller. The material movement system further may move a second number of lengths of material towards the roller. The material delivery structure may have a first guide on a first side of the material delivery structure. The first guide may be configured to guide the first number of lengths of material in the plurality of lengths of material to the roller. The material delivery structure may have a second guide on a second side of the material delivery structure. The second guide may be configured to guide the second number of lengths of material in the plurality of lengths of material to the roller. The first guide may comprise a first number of channels. The second guide may comprise a second number of channels. The first number of channels may be offset from the second number of channels. The first guide may be positioned at an angle relative to the second guide such that the first guide and the second guide substantially intersect at a location of the roller. The roller, the material delivery structure, the first guide, and the second guide may form an end effector. A positioning system may be associated with the material delivery structure and may move the end effector relative to the mold. The roller may be moved to the first position when the material delivery structure moves in a first direction. The roller may be moved to the second position when the material delivery structure moves in a second direction that is substantially opposite to the first direction. The plurality of lengths of material may be placed on the mold with the roller. The plurality of lengths of material may be cut when the plurality of lengths of material has been placed in the first direction. A cutting system may be associated with the material delivery structure. The cutting system may cut the plurality of lengths of material when the plurality of lengths of material has been placed in the first direction.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 13 is an illustration of a portion of an end effector in accordance with an advantageous embodiment;

FIG. 14 is an illustration of a roller in a second position in accordance with an advantageous embodiment;

FIG. 19 is an illustration of an aircraft manufacturing and service method in accordance with an advantageous embodiment; and FIG. 20 is an illustration of an aircraft in which an advantageous embodiment may be implemented.

DETAILED DESCRIPTION

The different advantageous embodiments recognize and take into account that machines that rotate about 180 degrees to move in a reverse direction to lay down fiber materials may be faster than moving the fiber placement head back to the starting position to lay down additional fiber material.

The different advantageous embodiments recognize and take into account that when moving in two directions that may be opposite to each other, the fiber placement head of the machine may rotate about 180 degrees. This rotation of the fiber placement head may be performed to reverse the lay down direction of the fiber materials.

The different advantageous embodiments recognize and take into account that these types of machines may have mechanical assemblies that may be larger than desired. Additionally, the fiber placement head may have tow paths from which the material is supplied to the head, and these tow paths may be more complex than desired.

Further, the different advantageous embodiments also recognize and take into account that automated fiber placement systems may need increased maintenance because of the size of the rotations, the frequency of the rotations, and the complexity of the tow paths across the joint that rotates. The tow paths may be configured in which tape, tows, and/or other materials are laid down in a side-by-side arrangement.

Thus, the different advantageous embodiments provide a method and apparatus for placing fiber onto a surface of a structure.

Figure 1:
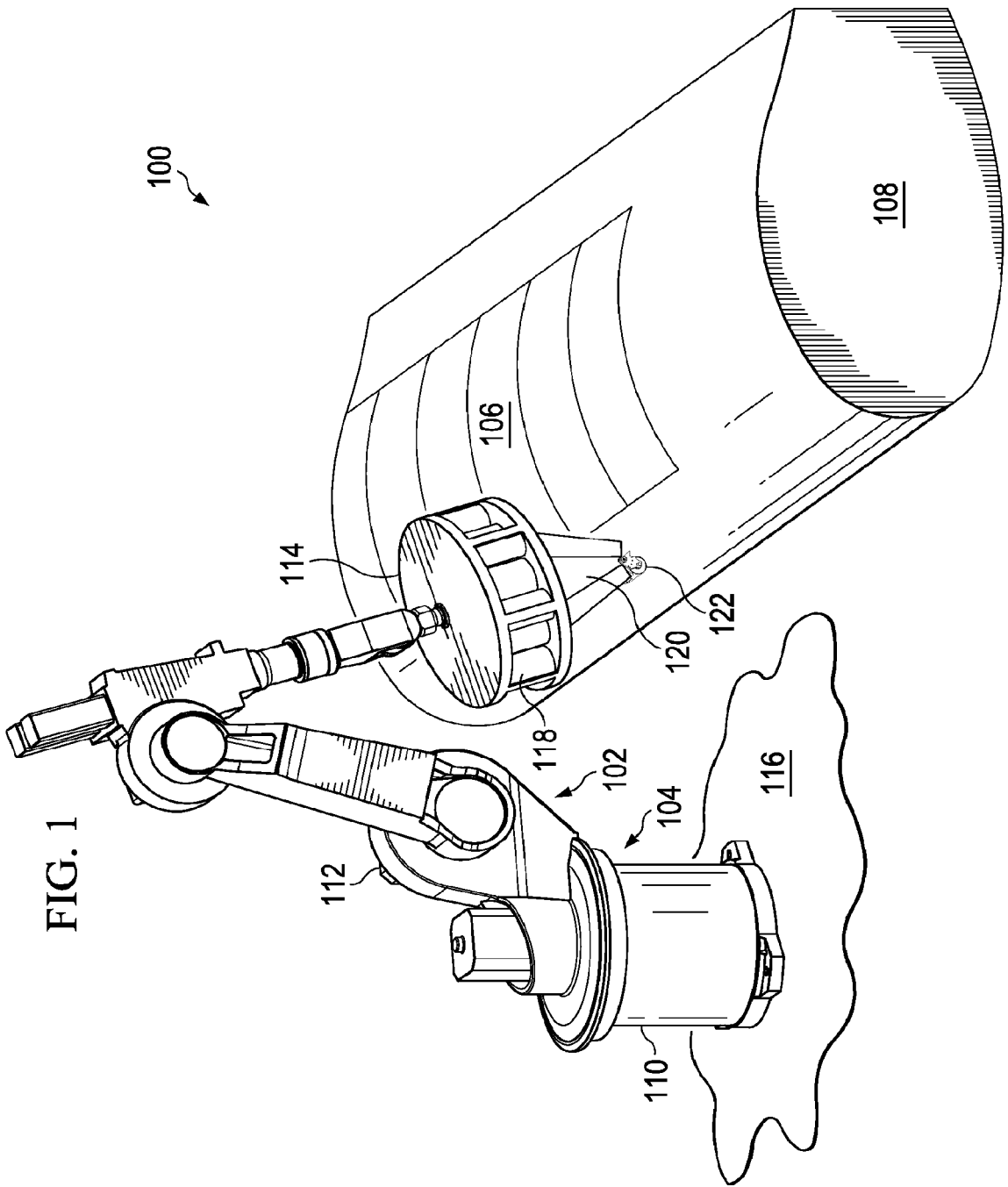
FIG. 1 is an illustration of a composite part manufacturing environment in accordance with an advantageous embodiment.

With reference now to FIG. 1, an illustration of a composite part manufacturing environment is depicted in accordance with an advantageous embodiment. In this illustrative example, composite part manufacturing environment 100 may comprise material placement system 102. In this illustrative example, material placement system 102 may take the form of automated fiber placement (AFP) system 104.

Material placement system 102 may lay up composite material 106 on mold 108. In this illustrative example, material placement system 102 may comprise base 110, arm 112, and end effector 114 as well as other components. Base 110 may be secured to floor 116. In other illustrative examples, base 110 may be attached to a movable platform.

In these illustrative examples, rolls of composite material 118 may be located in end effector 114. Composite material 106 may originate from rolls of composite material 118. In these illustrative examples, composite material 106 may have been placed onto mold 108 by material delivery structure 120 and roller 122. In these illustrative examples, roller 122 may be repositionable such that layup of composite material 106 from rolls of composite material 118 may be reduced in time.

Figure 2:
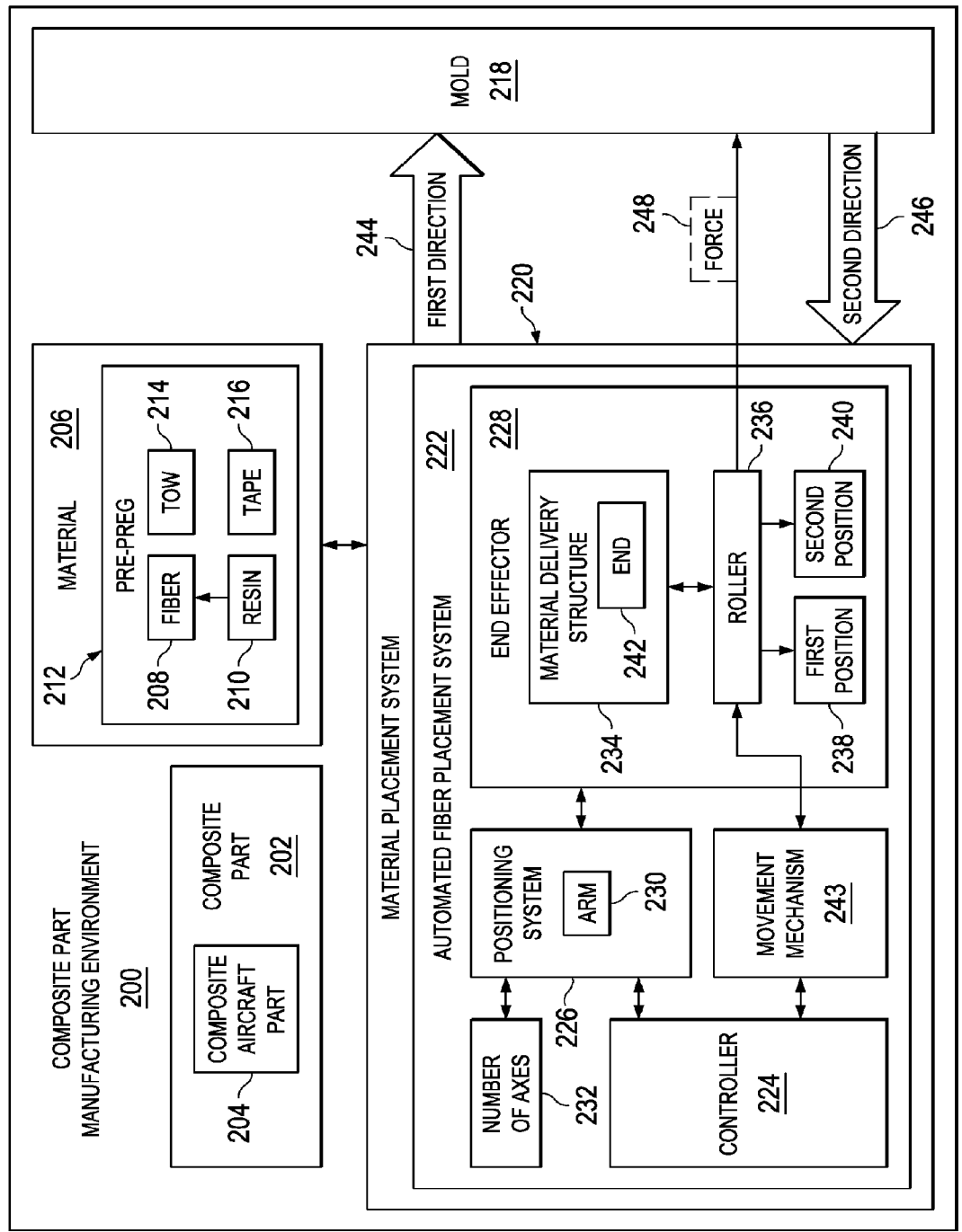
FIG. 2 is an illustration of a block diagram of a composite part manufacturing environment in accordance with an advantageous embodiment.

Turning now to FIG. 2, an illustration of a block diagram of a composite part manufacturing environment may be depicted in accordance with an advantageous embodiment. Composite part manufacturing environment 100 in FIG. 1 is an example of one implementation for composite part manufacturing environment 200.

In these illustrative examples, composite part manufacturing environment 200 may be used to manufacture composite part 202. In particular, composite part 202 may take the form of composite aircraft part 204 in these illustrative examples.

Composite part 202 may be formed from material 206. In these illustrative examples, material 206 may take the form of fiber 208. Material 206 may include resin 210. Resin 210 may be infused or impregnated within fiber 208 in material 206. In these illustrative examples, when resin 210 is in material 206, material 206 may be referred to as pre-preg 212.

Pre-preg 212 may take different forms. For example, without limitation, pre-preg 212 may take the form of tow 214, tape 216, and/or other suitable forms. Pre-preg 212 may be material 206 with resin 210 in a form ready to mold and/or cure. Tow 214 may be an untwisted bundle of filaments made from fibers. Typical tow widths for tow 214 may be, for example, without limitation, between from about ⅛" inch to about ½" wide. Tape 216 may be widths of pre-preg 212. These widths of tape 216 may be, for example, without limitation, from about one inch to about 60 inches. Of course, other widths may be used, depending on the particular implementation.

In these illustrative examples, material 206 may be placed on mold 218. Placement of material 206 on mold 218 may be performed using material placement system 220. In these illustrative examples, material placement system 220 may take the form of automated fiber placement system 222. As depicted, material placement system 220 may comprise controller 224, positioning system 226, end effector 228, and other suitable components.

Controller 224 may be a processor unit, a computer system, and/or some other suitable component configured to control the placement of material 206 on mold 218. Positioning system 226 may be a component configured to move end effector 228 relative to mold 218. Positioning system 226 may be, for example, without limitation, arm 230. Arm 230 may be configured to move number of axes 232. For example, number of axes 232 may be six axes and may provide about six degrees of freedom, depending on the particular implementation.

End effector 228 may comprise material delivery structure 234 and roller 236. As depicted, roller 236 may be comprised of a material configured to cause material 206 to lay substantially flat on mold 218. The material may be selected as one that has elastic properties. The material may be, for example, selected from one of rubber, an elastomer polymer, polyurethane, polyether-urethane, silicone, ethylene propylene, and other suitable materials.

Roller 236 may be movably rotatable. Additionally, roller 236 may be movably attached to material delivery structure 234 in addition to being rotatable. In these illustrative examples, roller 236 may be configured to move between first position 238 and second position 240. The movement of roller 236 between first position 238 and second position 240 may be relative to end 242 of material delivery structure 234.

Movement mechanism 243 may be configured to move roller 236 between first position 238 and second position 240. Movement mechanism 243 may be controlled by controller 224. Movement mechanism 243 may be implemented using any device capable of moving roller 236 between first position 238 and second position 240. For example, without limitation, movement mechanism 243 may be a pneumatic cylinder, an electro-servo actuator, and/or some other suitable type of device.

In these illustrative examples, roller 236 may be in first position 238 when material delivery structure 234 is moved in first direction 244. Roller 236 may be in second position 240 when material delivery structure 234 is moved in second direction 246. First direction 244 and second direction 246 may be substantially opposite of each other in these illustrative examples. Roller 236 may be configured to aid in placement of material 206 on mold 218. Additionally, roller 236 may be configured to apply force 248 on material 206. Force 248 may be applied such that material 206 may remain on mold 218 when placed on mold 218 by end effector 228. Force 248 may compact material 206 on mold 218.

Figure 3:
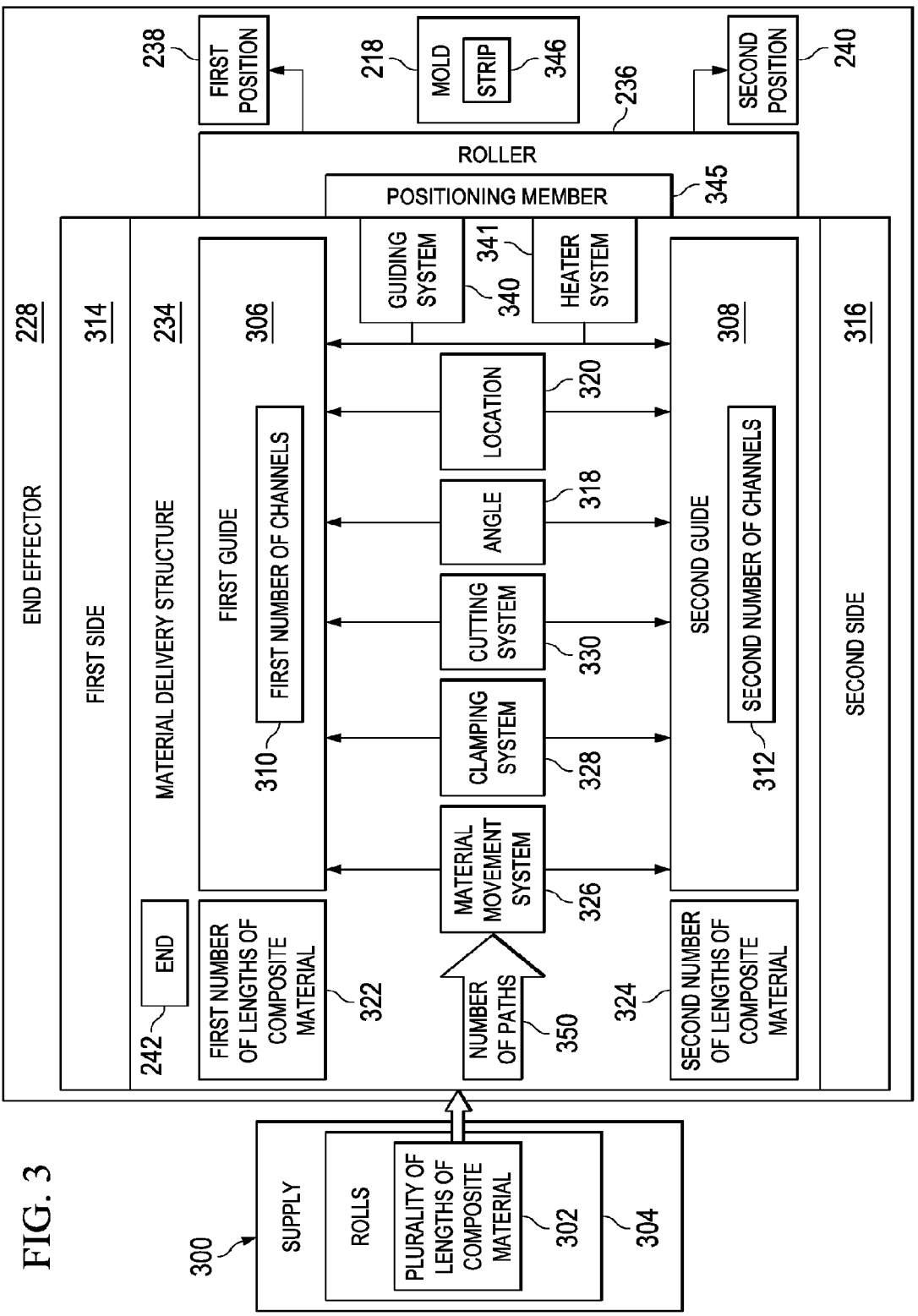
FIG. 3 is an illustration of a block diagram of an end effector in accordance with an advantageous embodiment.

Turning now to FIG. 3, an illustration of a block diagram of an end effector is depicted in accordance with an advantageous embodiment. In this illustrative example, supply 300 may be associated with end effector 228. Supply 300 may comprise plurality of lengths of composite material 302. Plurality of lengths of composite material 302 may be located in rolls 304 in supply 300. Each length in plurality of lengths of composite material 302 may be a tow. Plurality of lengths of composite material 302 may be supplied to material delivery structure 234.

In this illustrative example, material delivery structure 234 may have first guide 306 and second guide 308. First guide 306 may comprise first number of channels 310. Second guide 308 may comprise second number of channels 312. First guide 306 may be located on first side 314 of material delivery structure 234. Second guide 308 may be located on second side 316 of material delivery structure 234. In these illustrative examples, first number of channels 310 and second number of channels 312 may be opposite from each other on first side 314 and second side 316. First number of channels 310 and second number of channels 312 may be offset from each other. For example, a channel in first number of channels 310 on first side 314 may be offset from a channel in second number of channels 312 on second side 316.

In these illustrative examples, first guide 306 may be positioned at angle 318 relative to second guide 308. Angle 318 may be such that first guide 306 and second guide 308 substantially intersect at location 320 on material delivery structure 234. Location 320 may be a location of roller 236 at end 242.

As depicted, first number of lengths of composite material 322 in plurality of lengths of composite material 302 may be moved in first number of channels 310. Second number of lengths of composite material 324 in plurality of lengths of composite material 302 may be moved in second number of channels 312 in these illustrative examples.

In these illustrative examples, end effector 228 also may include material movement system 326. Material movement system 326 may be associated with material delivery structure 234 in these illustrative examples. Material movement system 326 may be configured to move first number of lengths of composite material 322 towards roller 236 and move second number of lengths of composite material 324 towards roller 236.

Additionally, clamping system 328 also may be included in end effector 228. Clamping system 328 may be associated with material delivery structure 234. Clamping system 328 may be configured to substantially halt movement of at least one of first number of lengths of composite material 322 and second number of lengths of composite material 324. Clamping system 328 may be operated in conjunction with cutting system 330.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

As illustrated, cutting system 330 may be present in end effector 228. Cutting system 330 may be associated with material delivery structure 234. Cutting system 330 may be configured to cut at least one of first number of lengths of composite material 322 and second number of lengths of composite material 324. Cutting system 330 may perform cutting operations on at least one of first number of lengths of composite material 322 and second number of lengths of composite material 324 when clamping system 328 halts movement of at least one of first number of lengths of composite material 322 and second number of lengths of composite material 324.

Guiding system 340 may guide first number of lengths of composite material 322 and second number of lengths of composite material 324 to roller 236. Further, heater system 341 may heat first number of lengths of composite material 322 and second number of lengths of composite material 324 that are placed onto roller 236. Heating by heater system 341 may occur prior to first number of lengths of composite material 322 and second number of lengths of composite material 324 being placed onto roller 236; as first number of lengths of composite material 322 and second number of lengths of composite material 324 are placed onto roller 236; after first number of lengths of composite material 322 and second number of lengths of composite material 324 are placed onto roller 236; or some combination thereof.

In the illustrative examples, heater system 341 may be configured to heat at least one of first number of lengths of composite material 322 and second number of lengths of composite material 324.

In these illustrative examples, roller 236 may be associated with positioning member 345. Positioning member 345 may be configured to allow roller 236 to move between first position 238 and second position 240. The movement may be performed using movement mechanism 243 in FIG. 2. More specifically, movement mechanism 243 may be connected to positioning member 345 and may move positioning member 345 in a manner that causes roller 236 to move between first position 238 and second position 240.

Roller 236 may then place first number of lengths of composite material 322 and second number of lengths of composite material 324 onto mold 218 as strip 346. In other words, first number of lengths of composite material 322 and second number of lengths of composite material 324 may be adjacent to each other to form strip 346 when placed onto mold 218. Further, roller 236 may compact strip 346 on mold 218.

Further, guiding system 340 and/or heater system 341 also may be associated with positioning member 345. As a result, guiding system 340 and/or heater system 341 may also be moved between first position 238 and second position 240 with roller 236.

In these illustrative examples, each length in plurality of lengths of composite material 302 may be assigned to a channel in first number of channels 310 and second number of channels 312. When end effector 228 changes direction without rotating, the assignment of plurality of lengths of composite material 302 may be reversed. The reversing of the assignment of plurality of lengths of composite material 302 may occur such that a program for placing plurality of lengths of composite material 302 may correctly lay down plurality of lengths of composite material 302 onto mold 218.

With end effector 228, number of paths 350 of first number of lengths of composite material 322 and second number of lengths of composite material 324 in plurality of lengths of composite material 302 may be simpler as compared to end effectors that rotate about 180 degrees. In other words, number of paths 350 for first number of lengths of composite material 322 and second number of lengths of composite material 324 may not need to take into account rotation for material delivery structure 234 in end effector 228 relative to supply 300. Instead, number of paths 350 for first number of lengths of composite material 322 and second number of lengths of composite material 324 may remain fixed.

Further, end effector 228 also may be smaller in size as compared to end effectors that have rotating components. Additionally, without needing to rotate components about 180 degrees and/or to move back across mold 218, time needed to lay down plurality of lengths of composite material 302 onto mold 218 may be reduced. For example, direction reversal may be performed in a fraction of a second using end effector 228 as compared to several seconds with currently-available end effectors. When large composite parts are being formed, this difference may result in reducing time needed to lay up the composite part by hours. Further, maintenance for end effector 228 may be reduced as compared to currently-available end effectors with the use of less moving parts.

The illustration of composite part manufacturing environment 200 in FIG. 2 and end effector 228 in FIG. 3 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, composite part 202 may take other forms. For example, composite part 202 may be a composite part for a building, a ship, an automobile, a spacecraft, and/or other suitable objects. Further, material placement system 220 may include additional end effectors in addition to and/or in place of end effector 228 for placing material 206 onto mold 218. In still other illustrative examples, composite material may be supplied only from one side rather than first side 314 and second side 316, depending on the particular implementation. Further, material 206 may also take other forms other than tow 214 and tape 216. For example, material 206 may take the form of fabric or a combination of tow 214 and tape 216.

As another example, end effector 228 also may include a heater system configured to heat material 206 prior to material 206 being placed onto mold 218. In still other illustrative examples, supply 300 may be a separate composite from end effector 228. In yet another example, actuators and motors may be present to move or reposition components, such as material 206, roller 236, and other components in end effector 228.

The different components illustrated in FIGS. 1 and 4-16 may be combined with components in FIGS. 2 and 3, used with components in FIGS. 2 and 3, or a combination of the two. Additionally, some of the components illustrated in FIGS. 1 and 4-16 may be illustrative examples of how components shown in block form in FIGS. 2 and 3 may be implemented as physical structures.

In the illustrative examples, composite part 202 has been described as composite aircraft part 204 for an aircraft. In other illustrative examples, composite part 202 may be a composite part for other types of platforms other than an aircraft. One or more different advantageous embodiments may be used to place composite material for a platform that has composite parts and/or sections.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a wind turbine generator, a manufacturing facility, a building, and/or some other suitable object.

In an illustrative, non-limiting example, one or more different advantageous embodiments may be applied to manufacturing blades for wind turbines. The different advantageous embodiments may be used to place composite material for a blade for use in a wind turbine. The different advantageous embodiments may be used to place composite material for manufacturing other structures used for power generation.

As another illustrative and non-limiting example, one or more different advantageous embodiments may be used to place composite materials for a platform used to hold solar cells. In yet another illustrative example, one or more different advantageous embodiments may be used to place composite materials for automobile hoods, consumer electronics, golf equipment, and other objects that have composite materials.

Figure 4:
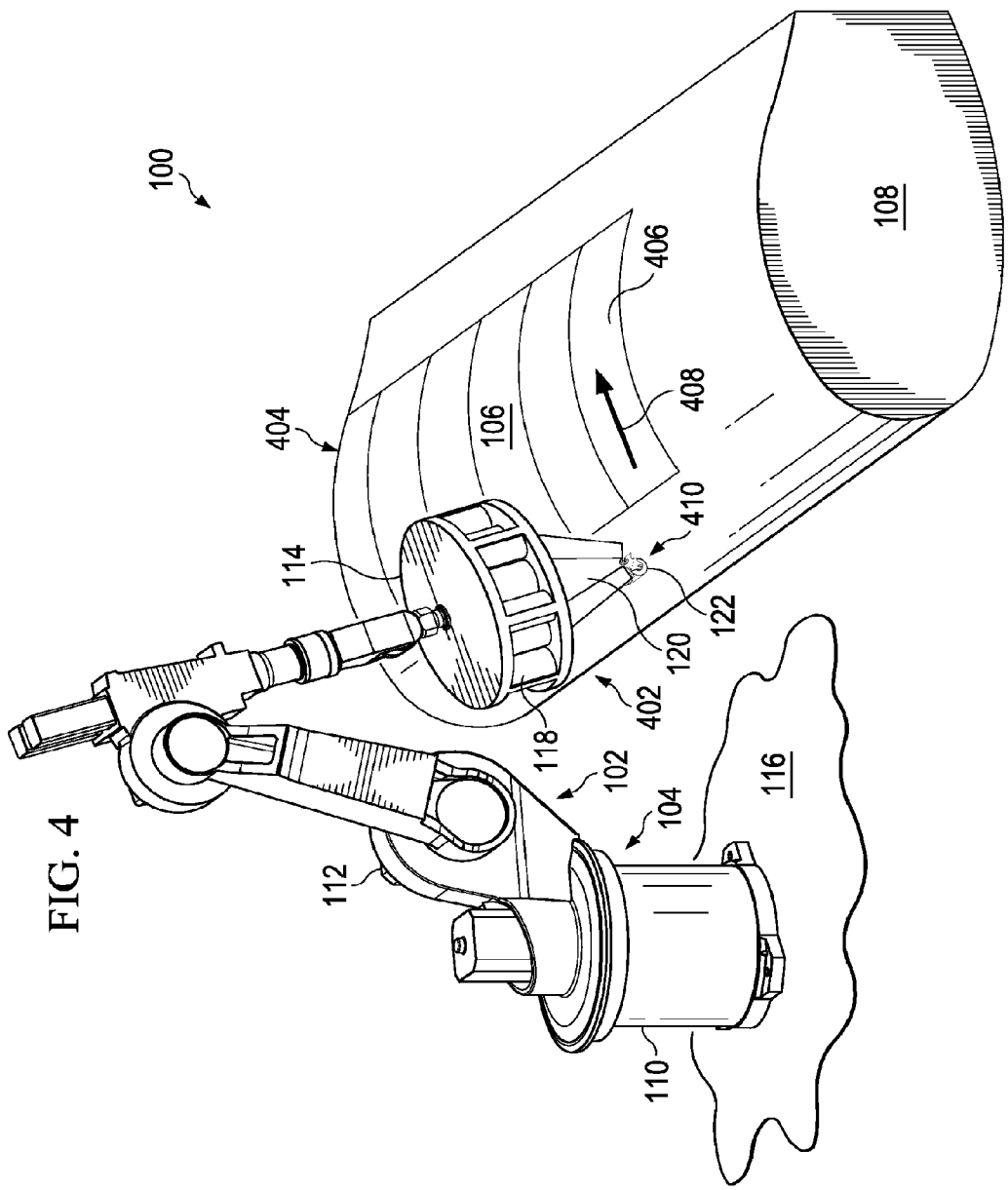
FIG. 4 is an illustration of a placement of composite material on a mold in accordance with an advantageous embodiment.

Turning to FIG. 4, an illustration of a placement of composite material on a mold is depicted in accordance with an advantageous embodiment. In this illustrative example, composite material 106 in composite part manufacturing environment 100 may take the form of tows. Plurality of lengths of tows 402 may be guided through material delivery structure 120 from rolls of composite material 118. In these illustrative examples, rolls of composite material 118 may be rolls of tows. These tows may be unidirectional in the illustrative examples.

In this illustrative example, end effector 114 may place plurality of lengths of tows 402 onto mold 108. Plurality of lengths of tows 402 may be placed down on mold 108 in strips 404.

For example, without limitation, plurality of lengths of tows 402 may be placed down on mold 108 to form strip 406 on mold 108 as end effector 114 moves in the direction of arrow 408. When end effector 114 moves in the direction of arrow 408, roller 122 may have first position 410 relative to material delivery structure 120 on end effector 114.

Figure 5:
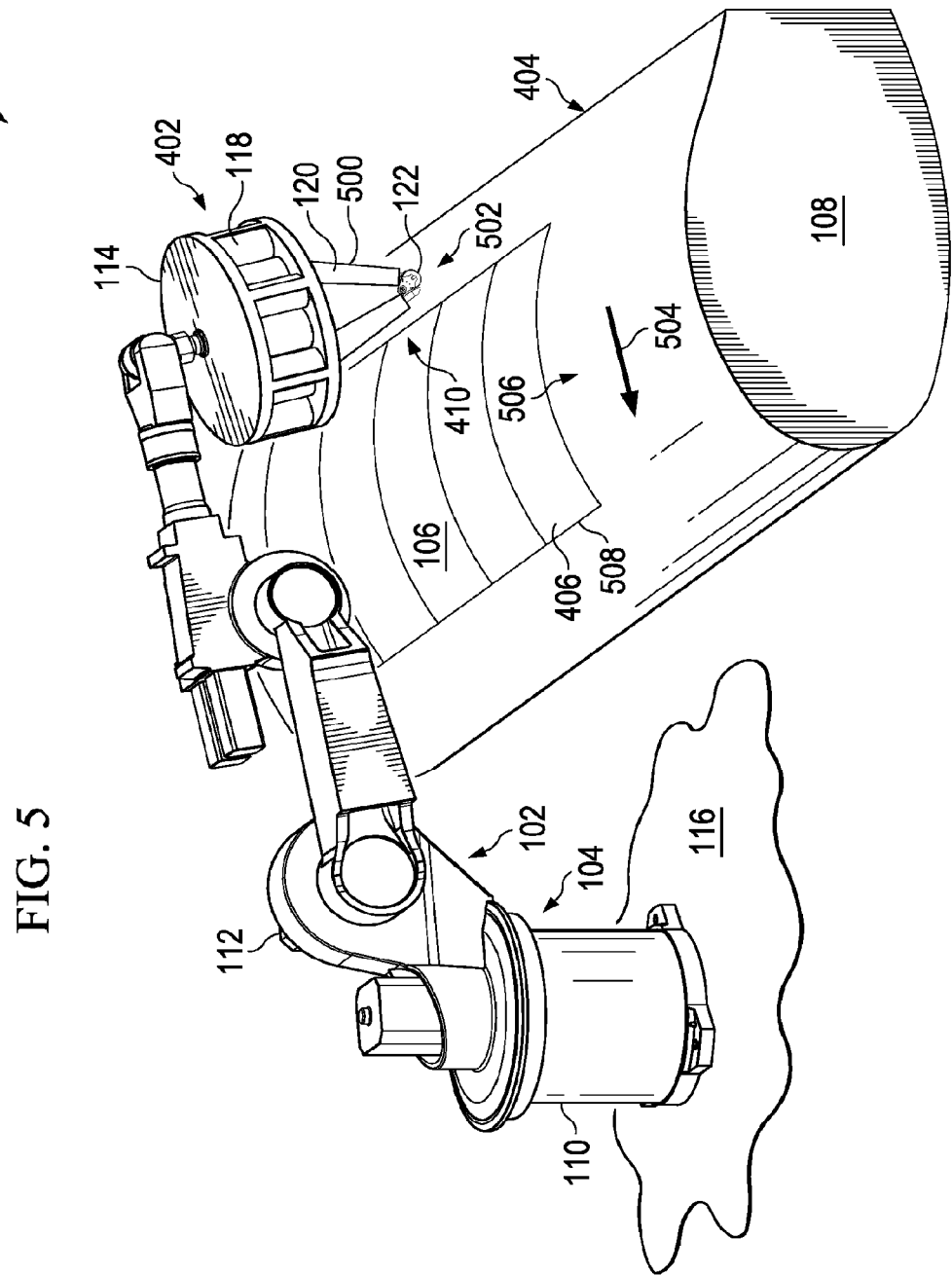
FIG. 5 is an illustration of a repositioning of an end effector in accordance with an advantageous embodiment.

Turning now to FIG. 5, an illustration of a repositioning of an end effector is depicted in accordance with an advantageous embodiment. When end effector 114 has completed laying strip 406 onto mold 108, material delivery structure 120 may cut plurality of lengths of tows 402 and may position itself to lay another strip on mold 108. Components (not shown) inside of housing 500 may manipulate plurality of lengths of tows 402.

In this illustrative example, prior to laying a new strip, roller 122 moves to second position 502. Second position 502 may be used when end effector 114 moves in the direction of arrow 504. The direction of arrow 504 may be opposite to the direction of arrow 408 in FIG. 4. In this illustrative example, end effector 114 may be moved to position 506 adjacent to location 508 of strip 406.

Figure 6:
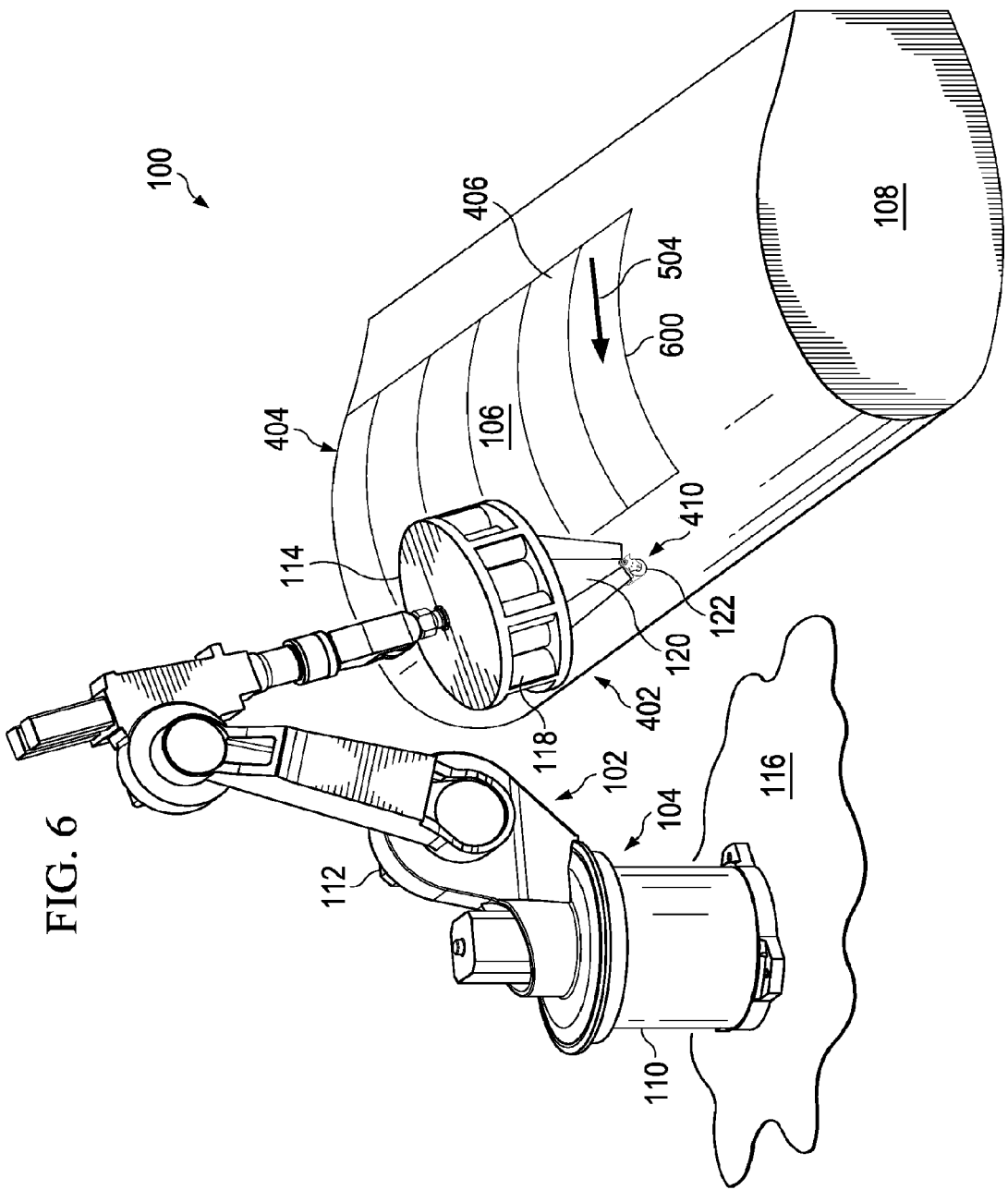
FIG. 6 is an illustration of a placement of composite material on a mold in accordance with an advantageous embodiment.

In FIG. 6, an illustration of a placement of composite material on a mold is depicted in accordance with an advantageous embodiment. In this illustrative example, plurality of lengths of tows 402 may be moved through material delivery structure 120 to roller 122 for laying strip 600 onto mold 108. In this illustrative example, strip 600 may be adjacent to strip 406. Strip 600 may be placed on mold 108 by placing plurality of lengths of tows 402 onto mold 108 as end effector 114 moves in the direction of arrow 504.

This process may be repeated for any number of subsequent strips of composite material to be placed on mold 108. In this manner, a reduction in the amount of movement for end effector 114 may occur. This reduction may occur through movement of end effector 114 through moving roller 122 between first position 410 and second position 502 in FIG. 5 instead of rotating end effector 114 about 180 degrees in these illustrative examples. This type of movement of roller 122 without moving other portions of end effector 114 that may be in the path of moving plurality of lengths of tows 402 may reduce the complexity and size of end effector 114 in these illustrative examples.

Figure 7:
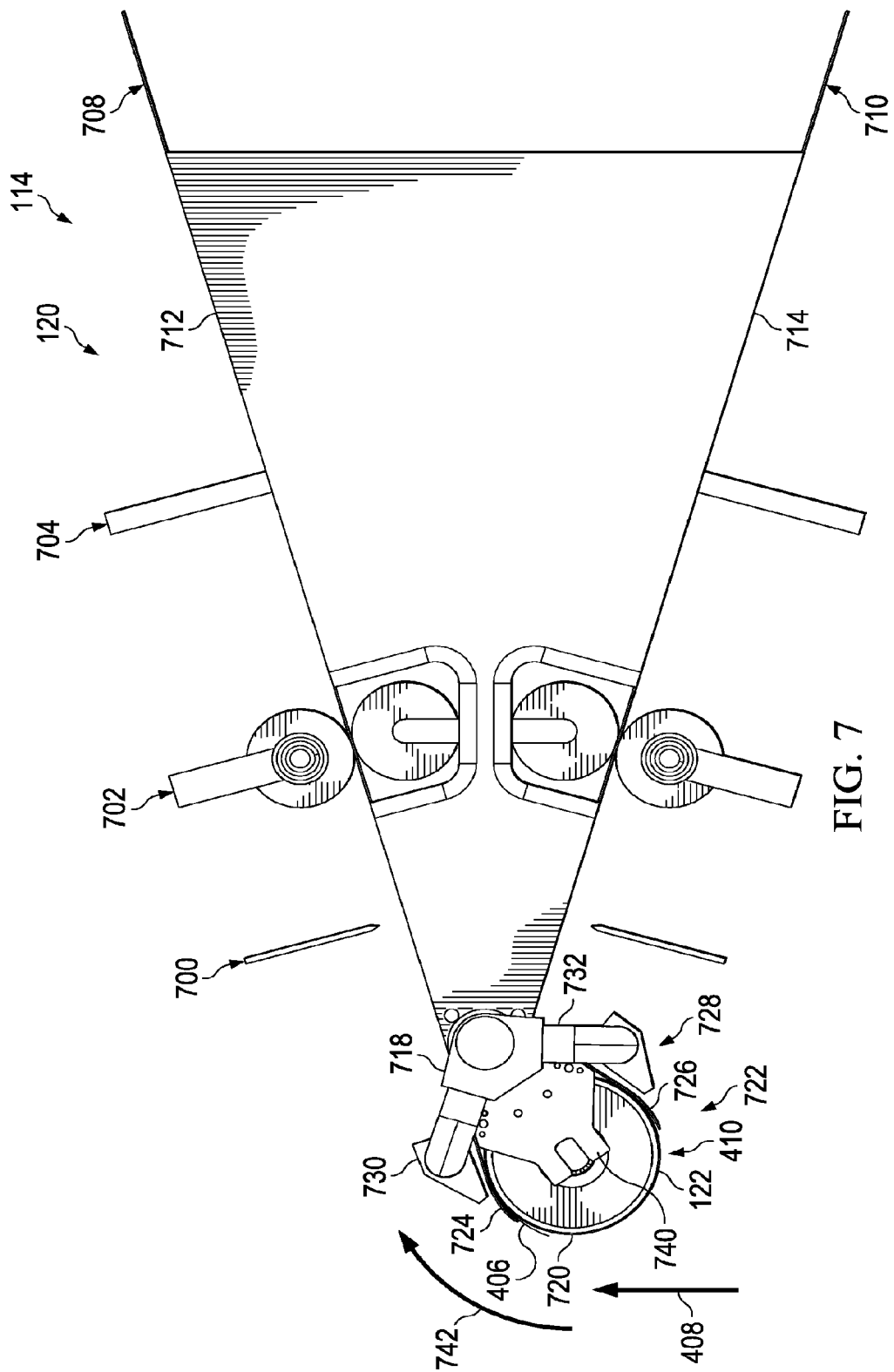
FIG. 7 is an illustration of a portion of an end effector from a side view in accordance with an advantageous embodiment.

With reference now to FIG. 7, an illustration of a portion of an end effector from a side view is depicted in accordance with an advantageous embodiment. In this illustrative example, material delivery structure 120 for end effector 114 may be seen in an exposed view without housing 500.

In this view, portions of cutting system 700, material movement system 702, and clamping system 704 may be seen for material delivery structure 120. In this example, roller 122 may be in first position 410 when end effector 114 moves in the direction of arrow 408.

In this illustrative example, first number of lengths of composite material 708 and second number of lengths of composite material 710 may be moved through material delivery structure 120 to reach roller 122. In this illustrative example, first number of lengths of composite material 708 may move on first side 712 of material delivery structure 120. Second number of lengths of composite material 710 may move on second side 714 of material delivery structure 120.

In these illustrative examples, first number of lengths of composite material 708 may be offset relative to second number of lengths of composite material 710. This offset may be such that strip 406 may be formed at end 718 of material delivery structure 120. In particular, strip 406 may be present on surface 720 of roller 122.

In this example, guiding system 722 may guide strip 406 on roller 122 for placement onto mold 108 (not shown). Guiding system 722 may include guiding structure 724 and guiding structure 726.

In particular, guiding structure 724 for guiding system 722 may cause first number of lengths of composite material 708 and second number of lengths of composite material 710 to form strip 406 at end 718. Guiding structure 724 may be configured such that first number of lengths of composite material 708 and second number of lengths of composite material 710 converge at end 718 to reach surface 720 of roller 122. Further, guiding structure 724 also may guide strip 406 onto roller 122.

As depicted, heater system 728 may comprise heater 730 and heater 732. Heater system 728 is depicted in first position 410 and may be configured to heat strip 406.

As depicted, roller 122 may be associated with positioning member 740. Roller 122 may be placed in first position 410 by positioning member 740. Positioning member 740 may move roller 122 in the direction of arrow 742. Movement of roller 122 in the direction of arrow 742 may move roller 122 from first position 410 to second position 502 (not shown). In these illustrative examples, guiding structure 724 and guiding structure 726 in guiding system 722 also may be associated with positioning member 740. Heater 730 and heater 732 in heater system 728 also may be associated with positioning member 740. As a result, guiding system 722 and/or heater system 728 also may move from first position 410 to second position 502 in the direction of arrow 742 when roller 122 is moved from first position 410 towards second position 502 (not shown) in the direction of arrow 742.

Figure 8:
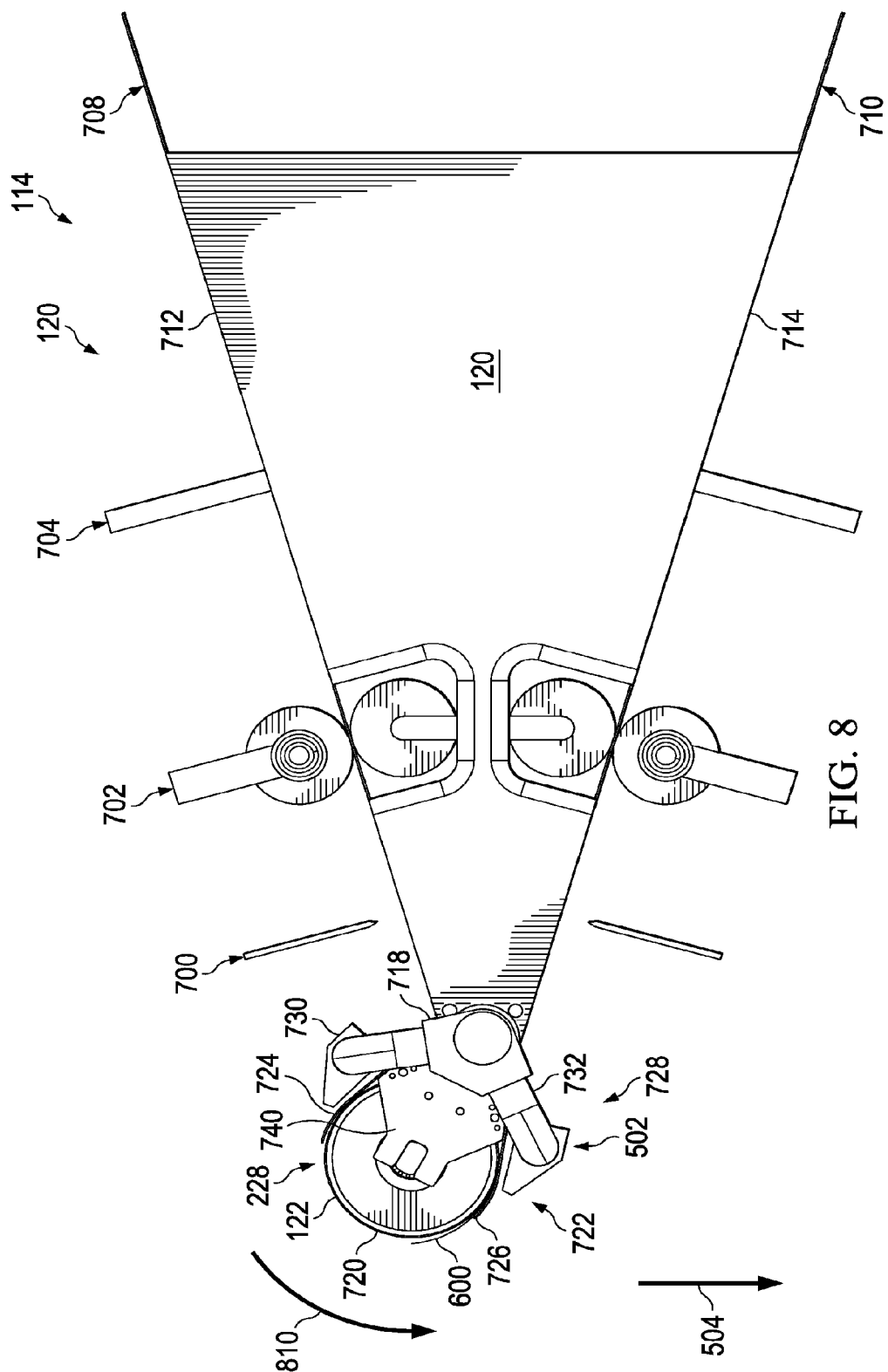
FIG. 8 is an illustration of another portion of an end effector from a side view in accordance with an advantageous embodiment.

Turning now to FIG. 8, an illustration of another portion of an end effector from a side view is depicted in accordance with an advantageous embodiment. As can be seen in this view, end effector 114 may move in the direction of arrow 504. Arrow 504 is a direction substantially opposite to arrow 408 in FIG. 7. In this illustrative example, roller 122 may be in second position 502. Additionally, guiding system 722 and/or heater system 728 also may be in second position 502. In this position, guiding structure 726 in guiding system 722 may guide strip 600 for placement onto mold 108 (not shown).

In this position, first number of lengths of composite material 708 and second number of lengths of composite material 710 may travel through material delivery structure 120 to reach end 718 of material delivery structure 120. At end 718, strip 600 may be formed from first number of lengths of composite material 708 and second number of lengths of composite material 710.

When roller 122 is in second position 502, this position may be such that first number of lengths of composite material 708 and second number of lengths of composite material 710 converge at end 718 to reach surface 720 of roller 122.

When moving in this direction and with roller 122 in second position 502, strip 600 may be formed and placed onto mold 108 on surface 720 of roller 122. In this illustrative example, guiding structure 726 in guiding system 722 guides first number of lengths of composite material 708 and second number of lengths of composite material 710 to form strip 600 at end 718. Further, guiding structure 724 also may guide strip 600 onto surface 720 of roller 122. Roller 122 may then be used to place strip 600 onto mold 108.

After strip 600 has been placed onto mold 108, roller 122 may be moved in the direction of arrow 810. Movement of roller 122 in the direction of arrow 810 may move roller 122 from second position 502 to first position 410 (not shown).

Figure 9:
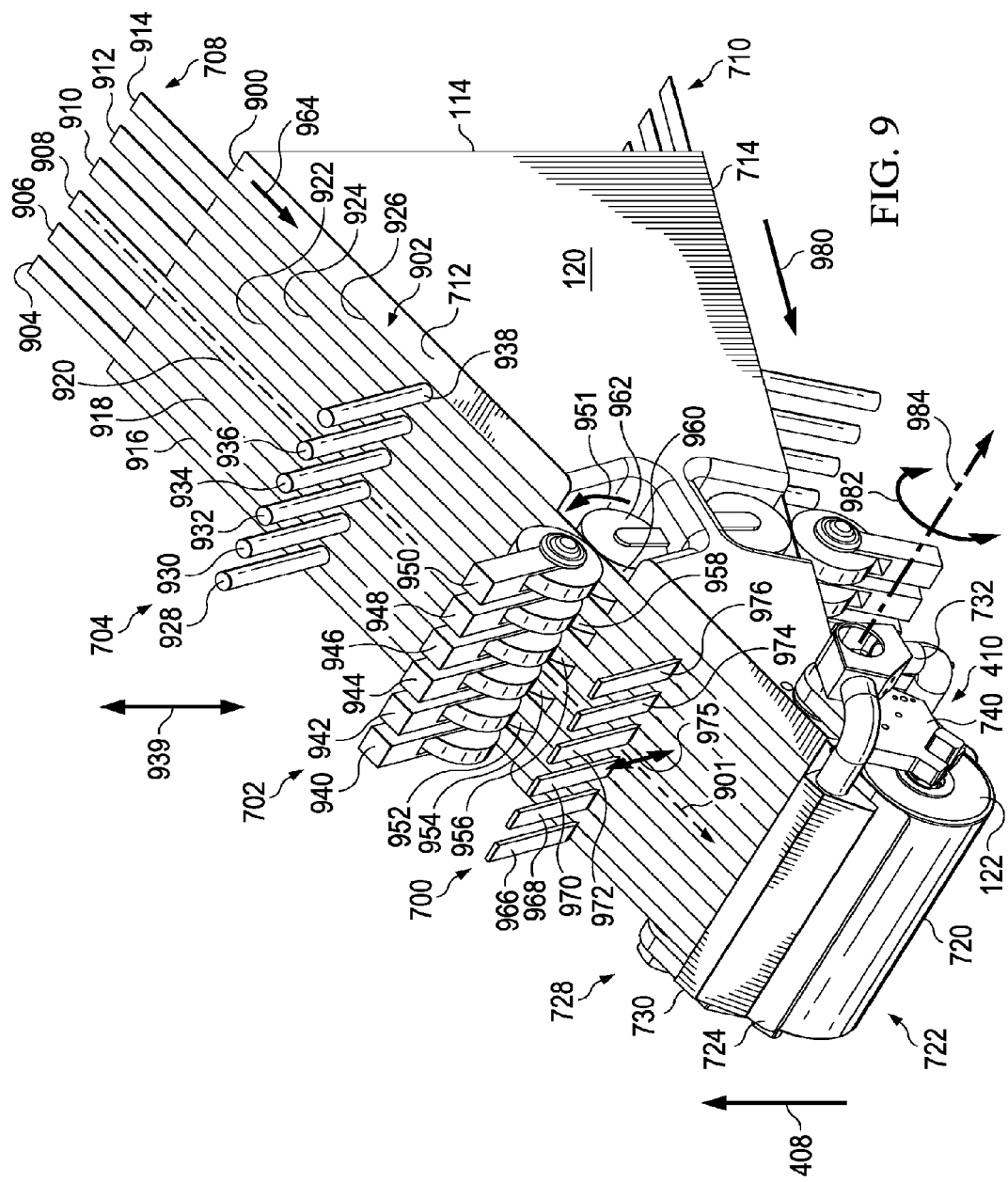
FIG. 9 is an illustration of a perspective view of an end effector in accordance with an advantageous embodiment.

With reference now to FIG. 9, an illustration of a perspective view of an end effector is depicted in accordance with an advantageous embodiment. A perspective view of end effector 114 is illustrated. In this view, housing 500 is not shown so that other components in end effector 114 may be seen.

In this illustrative example, first guide 900 may guide first number of lengths of composite material 708 on first side 712 towards roller 122 in path 901. In these illustrative examples, first guide 900 may comprise first number of channels 902.

In this illustrative example, each channel in first number of channels 902 may serve as a guide for a length of composite material in first number of lengths of composite material 708. In this illustrative example, first number of lengths of composite material 708 may comprise lengths 904, 906, 908, 910, 912, and 914. First number of channels 902 may comprise channels 916, 918, 920, 922, 924, and 926.

As illustrated, clamping system 704 may comprise members 928, 930, 932, 934, 936, and 938. Each one of these members may independently move in the direction of arrow 939 to halt movement of first number of lengths of composite material 708. One length may be stopped while another length continues to move in these illustrative examples.

Material movement system 702 may comprise rollers 940, 942, 944, 946, 948, and 950. These rollers may correspond to motorized rollers 952, 954, 956, 958, 960, and 962. Each of these motorized rollers may move a length of composite material in the guide corresponding to the roller.

For example, when motorized roller 962 rotates in the direction of arrow 951, length 914 may move through channel 926 in the direction of path 901. Roller 950 may rotate as motorized roller 962 rotates to aid in moving length 914 in channel 926.

In these illustrative examples, cutting system 700 may comprise cutters 966, 968, 970, 972, 974 and 976. Each of these cutters may move in the direction of arrow 975 to cut a length of composite material in first number of lengths of composite material 708. Each of these cutters may move independently of other cutters in the illustrative examples.

As depicted, second number of lengths of composite material 710 also may move in the direction of arrow 980 at the same time first number of lengths of composite material 708 moves in the direction of arrow 964.

As depicted, roller 122 may move between first position 410 and second position 502 (not shown in this view) in the direction of arrow 982 about axis 984. Guiding system 722 and/or heater system also may move between first position 410 and second position 502 (not shown) in the direction of arrow 982 about axis 984. These components may be moved using a movement mechanism (not shown).

Figure 10:
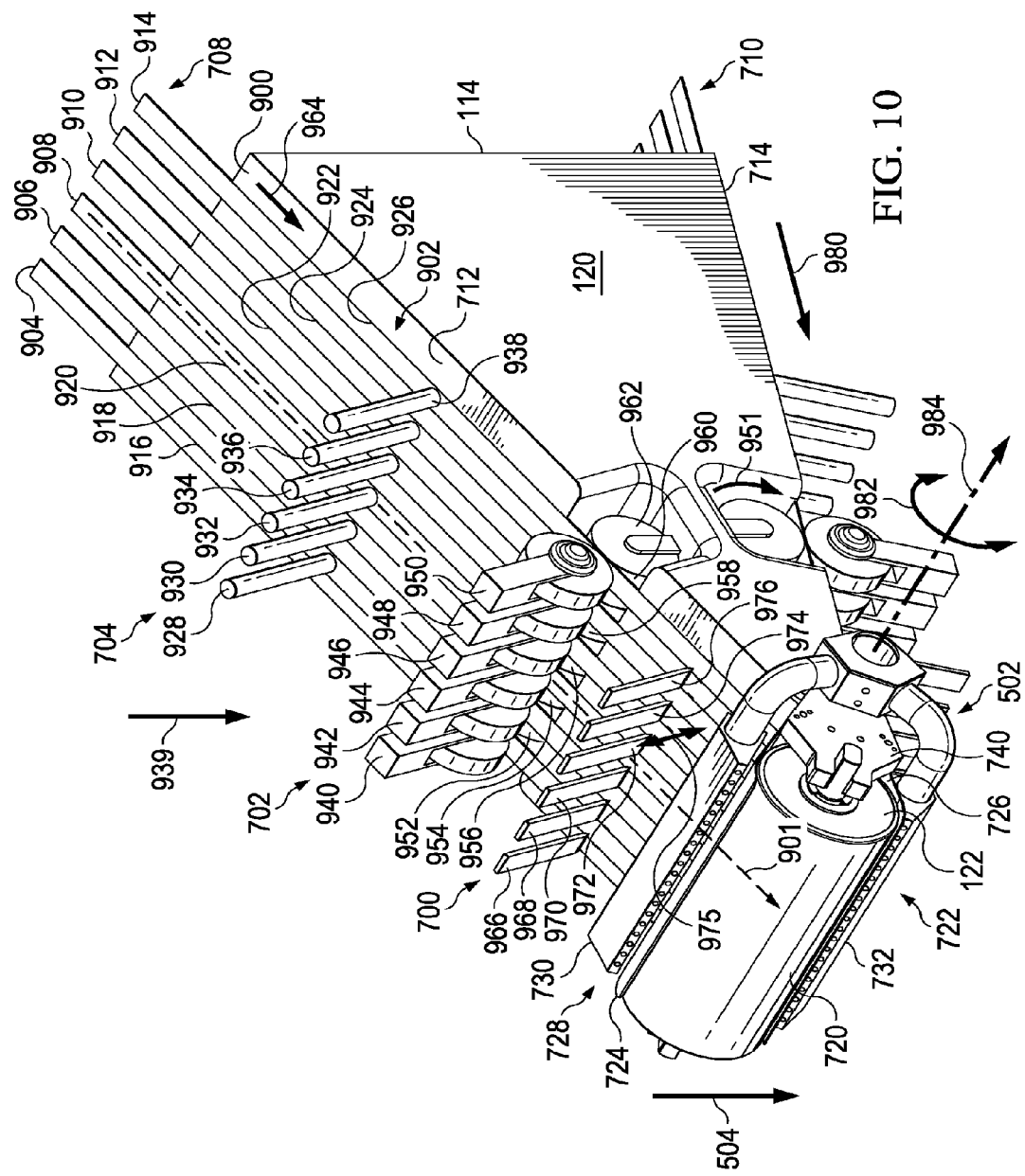
FIG. 10 is another illustration of an end effector in accordance with an advantageous embodiment.

Turning now to FIG. 10, another illustration of an end effector is depicted in accordance with an advantageous embodiment. In this illustrative example, roller 122 for end effector 114 may be in second position 502 when end effector 114 moves in the direction of arrow 504. Additionally, guiding system 722 may be in second position 502 when end effector 114 moves in the direction of arrow 504.

Figure 11:
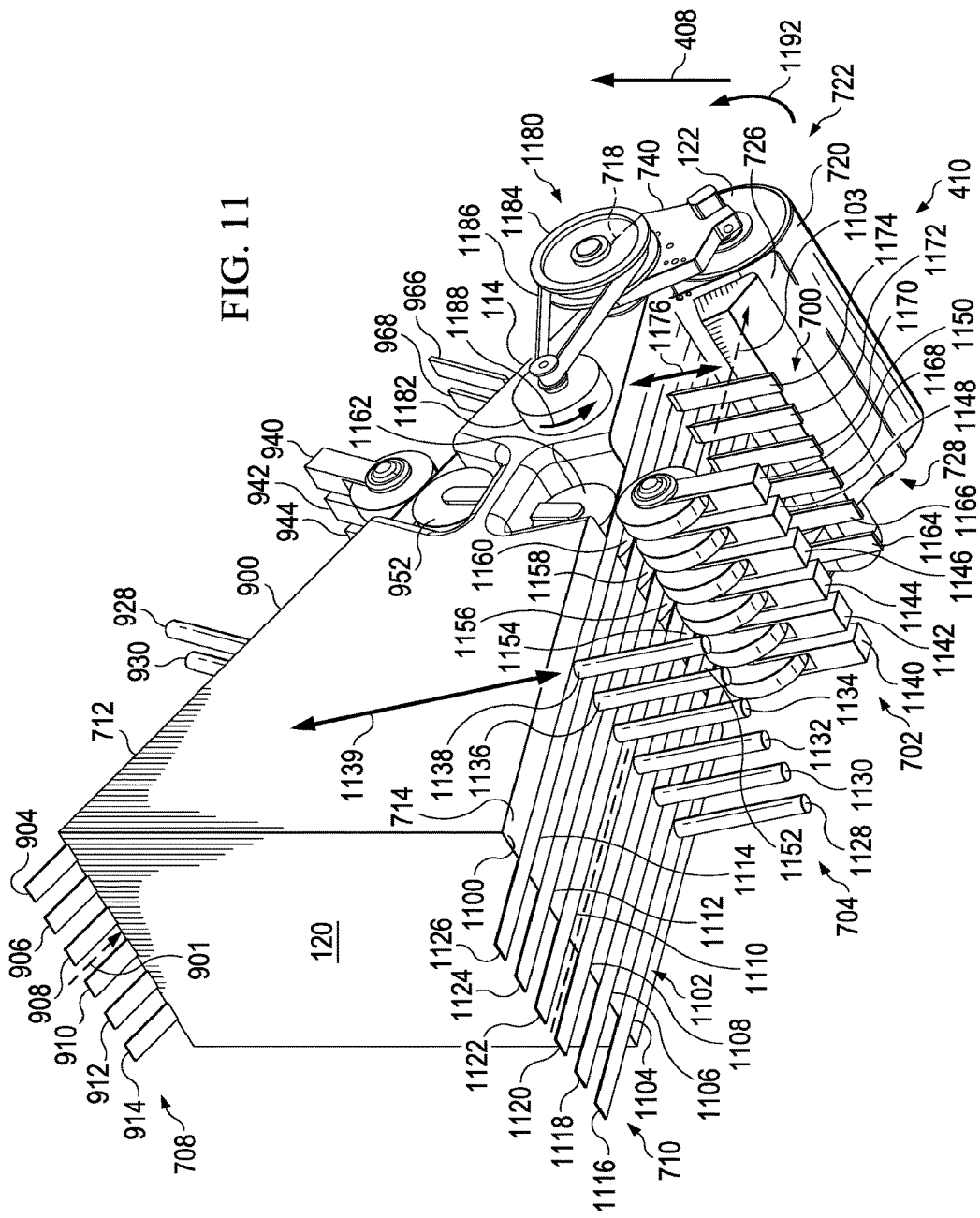
FIG. 11 is another illustration of a perspective view of an end effector in accordance with an advantageous embodiment.

Turning now to FIG. 11, another perspective view of an end effector is depicted in accordance with an advantageous embodiment. In this illustrative example, a more-detailed view of second side 714 of end effector 114 may be seen in FIG. 11.

As depicted, second guide 1100 may be seen on second side 714 of material delivery structure 120. In this illustrative example, second guide 1100 may comprise second number of channels 1102. Second number of channels 1102 may guide second number of lengths of composite material 710 towards end 718 of material delivery structure 120. Second number of lengths of composite material 710 may move along path 1103 in second number of channels 1102.

In this illustrative example, second number of channels 1102 may comprise channels 1104, 1106, 1108, 1110, 1112, and 1114. Second number of lengths of composite material 710 may comprise lengths 1116, 1118, 1120, 1122, 1124, and 1126.

As illustrated, clamping system 704 may include additional members on second side 714. These members may comprise members 1128, 1130, 1132, 1134, 1136, and 1138 and may move in the direction of arrow 1139. In a similar fashion, material movement system 702 also may further comprise motorized rollers 1140, 1142, 1144, 1146, 1148, and 1150. Rollers 1152, 1154, 1156, 1158, 1160, and 1162 may also be present in material movement system 702. Cutting system 700 also may comprise cutters 1164, 1166, 1168, 1170, 1172, and 1174. These cutters may move in the direction of arrow 1176.

In this view of end effector 114, movement mechanism 1180 may be seen. As depicted, movement mechanism 1180 may comprise servo motor 1182, wheel 1184, and drive belt 1186. As depicted, movement mechanism 1180 may be an example of an implementation of at least part of movement mechanism 243 in FIG. 2.

Servo motor 1182 may turn in the direction of arrow 1188 to move drive belt 1186 in a manner that turns wheel 1184 in the direction of arrow 1192. This movement may cause at least one of roller 122, guiding system 722, and heater system 728 to move in the direction of arrow 1192 from first position 410 towards second position 502 (not shown). Further, movement mechanism 1180 also may maintain at least one of roller 122, guiding system 722, and heater system 728 in first position 410 and/or second position 502 (not shown).

Figure 12:
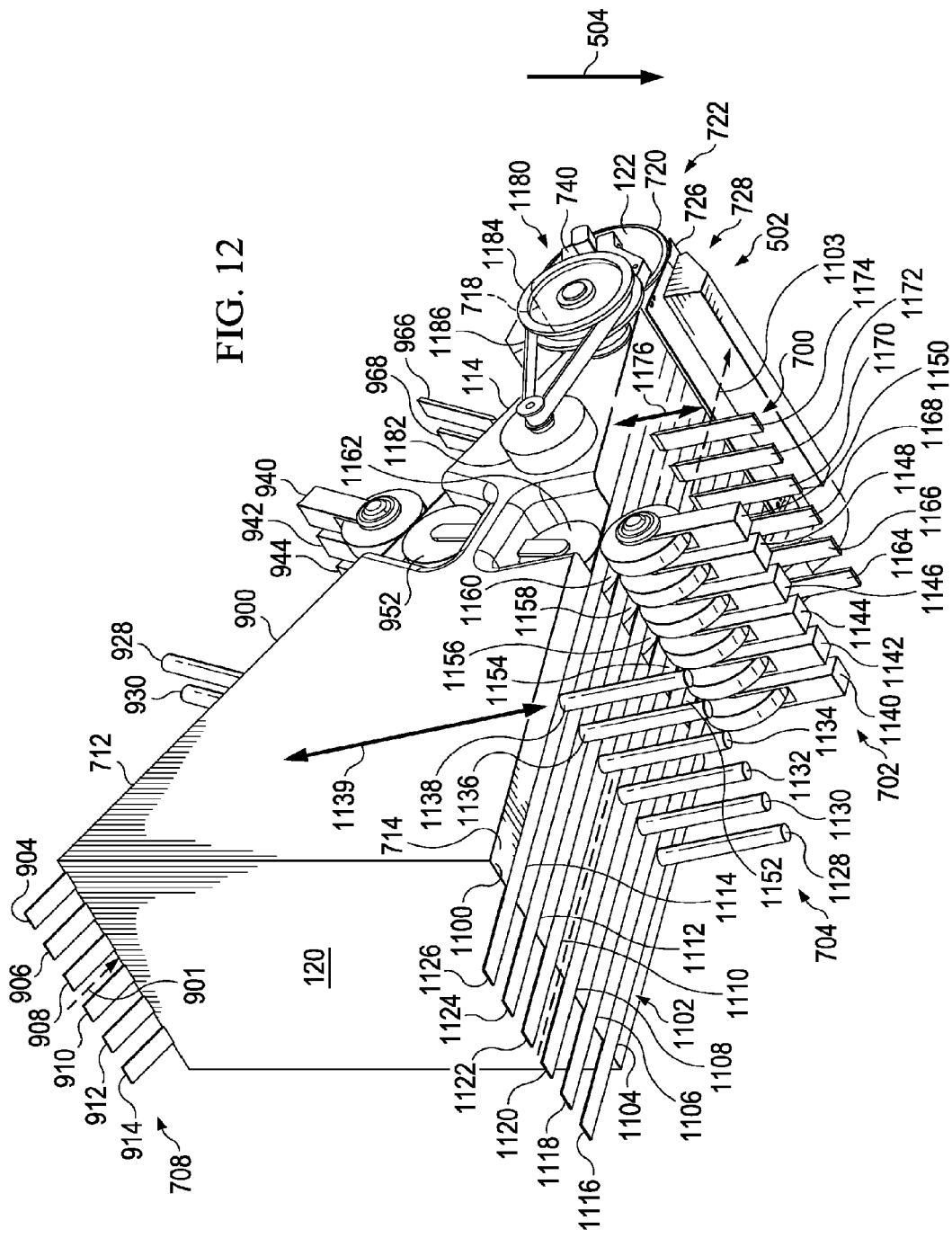
FIG. 12 is an illustration of an end effector in accordance with an advantageous embodiment.

With reference now to FIG. 12, an illustration of an end effector is depicted in accordance with an advantageous embodiment. In this illustrative example, end effector 114 may move in the direction of arrow 504. In this direction, roller 122 may be in second position 502.

Next, in FIG. 13, an illustration of a portion of an end effector is depicted in accordance with an advantageous embodiment. In this example, a portion of material delivery structure 120 with roller 122 for end effector 114 is depicted.

In this view, some components in end effector 114 are not shown to better illustrate guiding system 722. As depicted, guiding structure 724 in guiding system 722 may comprise scoop 1300 and channel extender 1302. A partial cutaway of scoop 1300 is shown to illustrate more details of channel extender 1302. In this example, roller 122 may be in first position 410.

In this illustrative example, channel extender 1302 may have first side 1304 and second side 1306. First number of channels 1308 in channel extender 1302 may correspond to first number of channels 902 in first guide 900. Scoop 1300 and/or channel extender 1302 may direct first number of lengths of composite material 708 (not shown) in first guide 900 and second number of lengths of composite material 710 (not shown) in second guide 1100 onto roller 122.

Turning next to FIG. 14, an illustration of a roller in a second position is depicted in accordance with an advantageous embodiment. When in second position 502, scoop 1400 for guiding structure 726 may be seen. In this example, scoop 1400 also is shown in a partially cutaway view.

Figure 15:
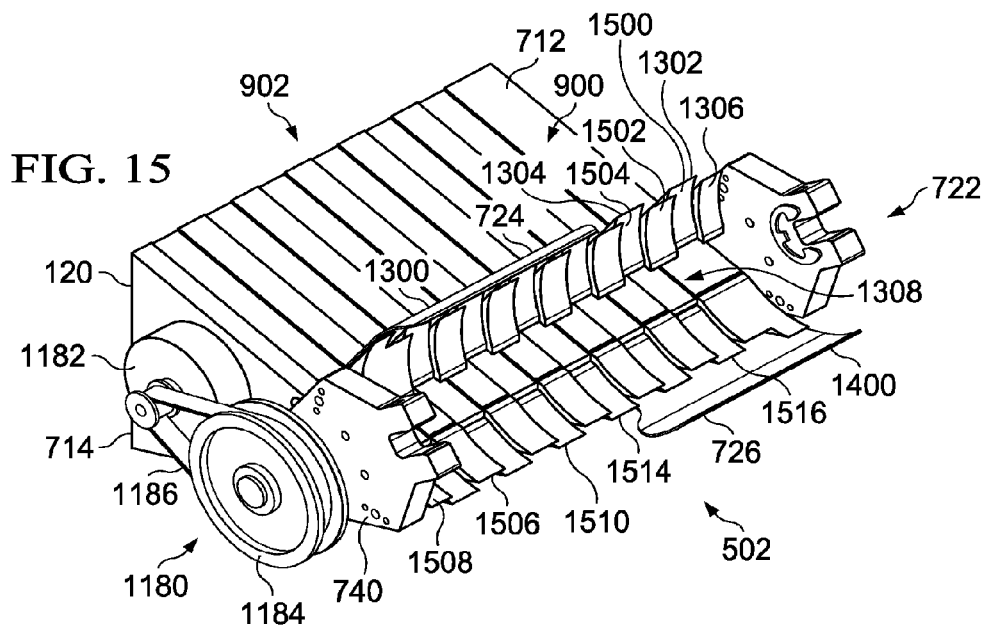
FIG. 15 is an illustration of a guiding system in accordance with an advantageous embodiment.

In FIG. 15, an illustration of a guiding system is depicted in accordance with an advantageous embodiment. In this view, roller 122 has been removed to provide a better view of components in guiding system 722. As seen in this example, second number of channels 1500 on second side 1306 of channel extender 1302 may be seen in second position 502.

As depicted, first number of channels 1308 on first side 1304 may be offset from second number of channels 1500 on second side 1306. For example, first channel 1502 on first side 1304 may be offset from second channel 1504 on second side 1306.

In second position 502, as depicted in this view, first number of channels 1506 may be located on side 1508 of channel extender 1510 for guiding structure 726. First number of channels 1506 may be aligned with second number of channels 1102 (not shown) on second side 714 of material delivery structure 120. Second number of channels 1514 on side 1516 for channel extender 1510 may be aligned with first number of channels 902 in first guide 900 on first side 712 of material delivery structure 120.

Figure 16:
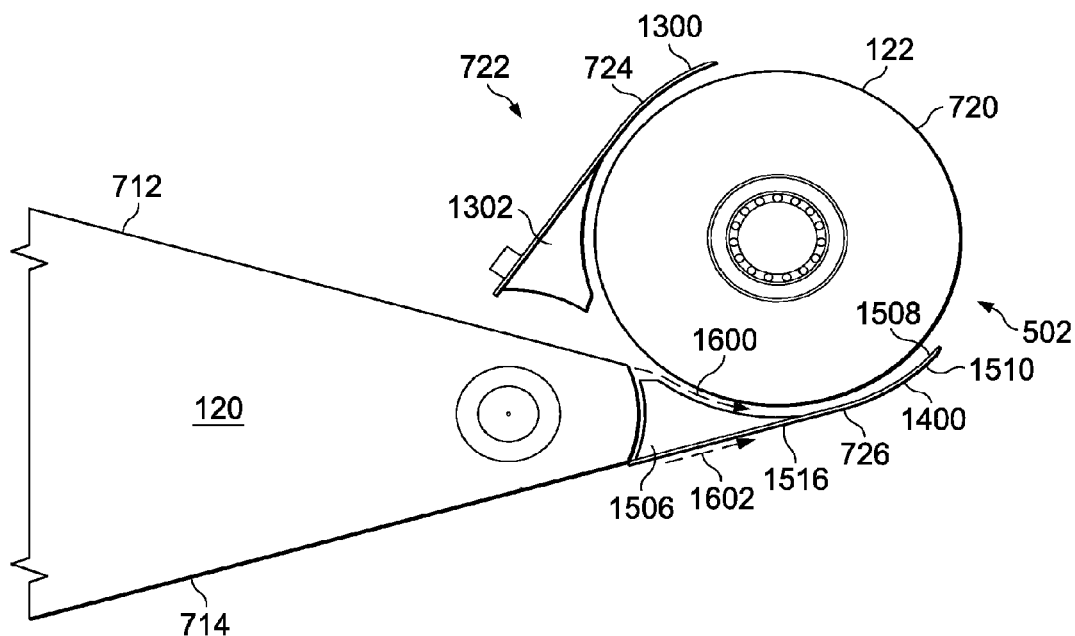
FIG. 16 is an illustration of a cross-sectional view of a guide system and a roller on a material delivery structure in accordance with an advantageous embodiment.

Turning now to FIG. 16, a cross-sectional view of a guiding system and a roller on a material delivery structure is depicted in accordance with an advantageous embodiment. As depicted, a cross-sectional view of guiding system 722 and roller 122 on material delivery structure 120 is seen taken along lines 16-16 in FIG. 13.

In this cross-sectional view, arrow 1600 may illustrate a path for first number of lengths of composite material 708 (not shown) on first side 712. Arrow 1602 may show a path for second number of lengths of composite material 710 (not shown) on second side 714. As can be seen, arrow 1600 and arrow 1602 may converge onto surface 720 of roller 122. Arrow 1600 and arrow 1602 may illustrate how channel extender 1510 in FIG. 15 may guide first number of lengths of composite material 708 and second number of lengths of composite material 710. Arrow 1600 may pass over side 1508 of channel extender 1510, while arrow 1602 may pass over side 1516 of channel extender 1510.

Figure 17:
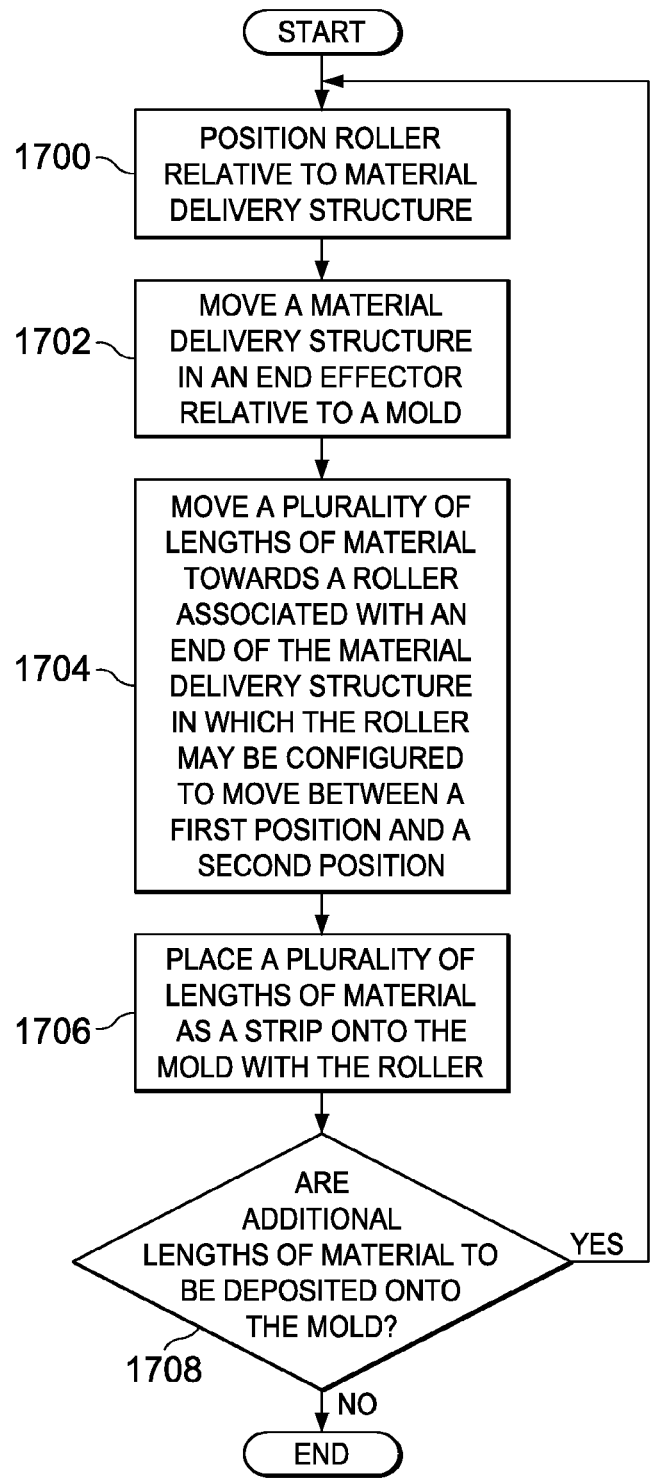
FIG. 17 is an illustration of flowchart of a process for placing material to form a composite part in accordance with an advantageous embodiment.

Turning now to FIG. 17, an illustration of a flowchart of a process for placing material to form a composite part is depicted in accordance with an advantageous embodiment. The process illustrated in FIG. 17 may be implemented in composite part manufacturing environment 200 in FIG. 2. In particular, this process may be implemented using material placement system 220 to place material 206 onto mold 218 to form composite part 202. In these illustrative examples, this composite part may be composite aircraft part 204.

The process may begin by positioning roller 236 relative to material delivery structure 234 (operation 1700). The process may then move material delivery structure 234 in end effector 228 relative to mold 218 (operation 1702). The process may move a plurality of lengths of material 206 towards roller 236 associated with an end of material delivery structure 234 in which roller 236 may be configured to move between first position 238 and second position 240 (operation 1704). The process may then place a plurality of lengths of material 206 as a strip onto mold 218 with roller 236 (operation 1706). In operation 1704, roller 236 also may compact material 206.

A determination is made as to whether additional lengths of material 206 are to be deposited onto mold 218 (operation 1708). If additional lengths of material are to be deposited, the process may return to operation 1700. Otherwise, the process may terminate.

Figure 18:
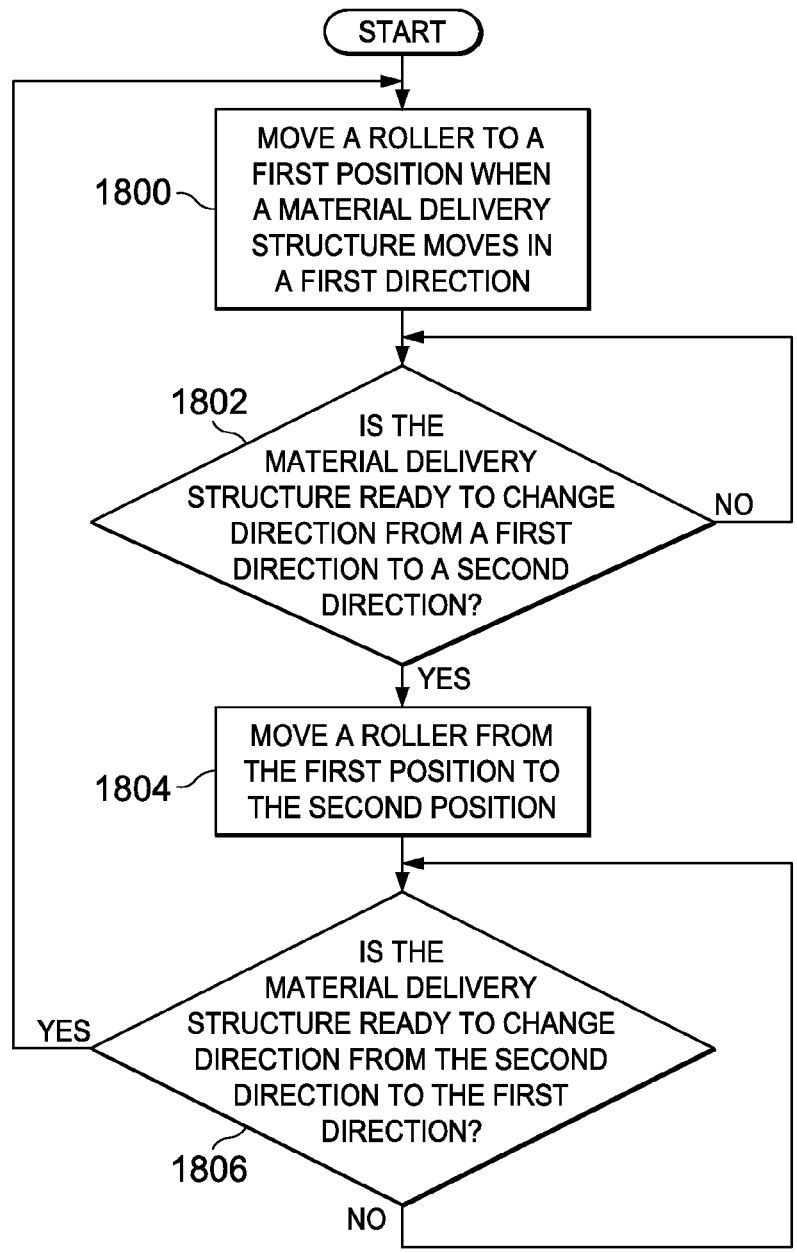
FIG. 18 is an illustration of a flowchart of a process for controlling the position of a roller in accordance with an advantageous embodiment.

Turning now to FIG. 18, an illustration of a flowchart of a process for controlling the position of a roller is depicted in accordance with an advantageous embodiment. This process may be implemented in automated fiber placement system 222 to control the position of roller 236 on end effector 228. In particular, this process may be implemented in controller 224 to control the position of roller 236.

The process may begin by moving roller 236 to first position 238 when material delivery structure 234 moves in first direction 244 (operation 1800). In other words, operation 1800 may involve positioning roller 236 relative to material delivery structure 234 in first position 238. A determination is made as to whether material delivery structure 234 is ready to change direction from first direction 244 to second direction 246 (operation 1802). If material delivery structure 234 is not ready to change direction from first direction 244 to second direction 246, the process may return to operation 1802.

Otherwise, roller 236 may be moved from first position 238 to second position 240 (operation 1804). In other words, operation 1804 may involve positioning roller 236 relative to material delivery structure 234 in second position 240. A determination is then made as to whether material delivery structure 234 is ready to change direction from second direction 246 to first direction 244 (operation 1806). If material delivery structure 234 is ready to change direction, the process may return to operation 1800. Otherwise, the process may return to operation 1806.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step.

For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, additional operations for moving lengths of composite material, halting lengths of composite material, cutting lengths of composite material, and other operations may be included in addition to the ones described above.

Advantageous embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an advantageous embodiment. During preproduction, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 may take place. Thereafter, aircraft 2000 in FIG. 20 may go through certification and delivery 1910 in order to be placed in service 1912. While in service 1912 by a customer, aircraft 2000 in FIG. 20 may be scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft is depicted in which an advantageous embodiment may be implemented. In this example, aircraft 2000 is produced by aircraft manufacturing and service method 1900 in FIG. 19 and may include airframe 2002 with plurality of systems 2004 and interior 2006. Examples of systems 2004 may include one or more of propulsion system 2008, electrical system 2010, hydraulic system 2012, and environmental system 2014. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 may be fabricated or manufactured in a manner similar to components or subassemblies produced while aircraft 2000 is in service 1912 in FIG. 19. As yet another example, one or more apparatus embodiments, method embodiments, or a combination thereof may be utilized during production stages, such as component and subassembly manufacturing 1906 and system integration 1908 in FIG. 19.

One or more apparatus embodiments, method embodiments, or a combination thereof may be utilized while aircraft 2000 is in service 1912 and/or during maintenance and service 1914 in FIG. 19. For example, without limitation, material placement system 220 with end effector 228 may be used to lay up composite materials for composite parts during component and subassembly manufacturing 1906, maintenance and service 1914, and/or during any other stage in aircraft manufacturing and service method 1900 in which composite materials are laid up for use in forming composite parts. The use of a number of the different advantageous embodiments may substantially expedite the assembly of and/or reduce the cost of aircraft 2000.

The description of the different advantageous embodiments has been presented for purposes of illustration and description and is not intended to be exhaustive or limited to the embodiments in the form disclosed. Many modifications and variations may be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for placing material for a composite part, the method comprising:
positioning a roller relative to a material delivery structure in which the roller is associated with an end of the material delivery structure;
moving the material delivery structure relative to a mold;
moving a plurality of lengths of material towards the roller; and
placing the plurality of lengths of material on the mold with the roller;
wherein the roller has an axis of rotation configured to move over a curved path between a first position and a second position relative to the material delivery structure; wherein the material delivery structure has a first guide on a first side of the material delivery structure in which the first guide is configured to guide a first number of lengths of material in the plurality of lengths of material to the roller and a second guide on a second side of the material delivery structure in which the second guide is configured to guide a second number of lengths of material in the plurality of lengths of material to the roller.

2. The method of claim 1 further comprising:
positioning the roller in a first position when the material delivery structure moves in a first direction; and
positioning the roller to a second position when the material delivery structure moves in a second direction that is substantially opposite to the first direction.

3. The method of claim 1, wherein a material movement system moves the plurality of lengths of material towards the roller.

4. The method of claim 2 further comprising:
cutting the plurality of lengths of material when the plurality of lengths of material has been placed in the first direction.

5. The method of claim 1, wherein the roller, the material delivery structure, the first guide, and the second guide form an end effector.

6. The method of claim 5, wherein a positioning system moves the end effector relative to the mold.

7. The method of claim 5, wherein a material movement system moves the first number of lengths of material in the plurality of lengths of material towards the roller and moves the second number of lengths of material towards the roller.

8. The method of claim 4, wherein a cutting system cuts the plurality of lengths of material when the plurality of lengths of material has been placed in the first direction.

9. The method of claim 1, wherein the first guide comprises a first number of channels and the second guide comprises a second number of channels.

10. The method of claim 9, wherein the first number of channels is offset from the second number of channels.

11. The method of claim 1, wherein the first guide is positioned at an angle relative to the second guide such that the first guide and second guide substantially intersect at a location of the roller.

12. A method for placing material for a composite part by moving a material delivery structure relative to a mold, the method comprising:

moving a plurality of lengths of material towards a roller associated with an end of the material delivery structure in which the roller is configured to move between a first position and a second position relative to the material delivery structure; in which a material movement system moves a first number of lengths of material in the plurality of lengths of material towards the roller and moves a second number of lengths of material towards the roller; in which the material delivery structure has a first guide on a first side of the material delivery structure in which the first guide is configured to guide the first number of lengths of material in the plurality of lengths of material to the roller and a second guide on a second side of the material delivery structure in which the second guide is configured to guide the second number of lengths of material in the plurality of lengths of material to the roller;

wherein the roller has an axis of rotation configured to move over a curved path between a first position and a second position relative to the material delivery structure.

13. The method of claim 12, wherein the first guide comprises a first number of channels and the second guide comprises a second number of channels.

14. The method of claim 13, wherein the first number of channels is offset from the second number of channels.

15. The method of claim 14, wherein the first guide is positioned at an angle relative to the second guide such that the first guide and the second guide substantially intersect at a location of the roller; in which the roller, the material delivery structure, the first guide, and the second guide form an end effector; and in which a positioning system is associated with the material delivery structure and moves the end effector relative to the mold.

16. The method of claim 15, further comprising:
moving the roller to the first position when the material delivery structure moves in a first direction.

17. The method of claim 16, further comprising:
moving the roller to the second position when the material delivery structure moves in a second direction that is substantially opposite to the first direction.

18. The method of claim 17, further comprising:
placing the plurality of lengths of material on the mold with the roller.

19. The method of claim 18, further comprising:
cutting the plurality of lengths of material when the plurality of lengths of material has been placed in the first direction; wherein a cutting system is associated with the material delivery structure and cuts the plurality of lengths of material when the plurality of lengths of material has been placed in the first direction.

* * * * *